Patented Apr. 8, 1924.

1,489,418

UNITED STATES PATENT OFFICE.

FRANK E. BACHMAN, OF PORT HENRY, NEW YORK.

PAINT AND PIGMENT.

No Drawing.  Application filed April 2, 1921. Serial No. 458,020.

*To all whom it may concern:*

Be it known that I, FRANK E. BACHMAN, residing at Port Henry, Essex County, New York, have invented a new and useful Improvement in Paints and Pigments, of which the following is a full, clear, and exact description.

My invention relates to paints and especially those paints and pigments which are composed to a greater or less extent of hydrated titanic oxide, and more especially to hydrated titanic oxide, known as modified meta titanic acid, described in my pending applications for patents, Serial No. 285,873, filed March 28, 1919 and Serial No. 453,355, filed March 18, 1921.

The objects of my invention comprise paints composed of modified meta titanic acid, which are improved in certain particulars, as for instance, their resistance to wear and their drying and hardening qualities. It has not been disclosed heretofore that meta titanic acid or modified meta titanic acid could be used for paint manufacture. I have found that both of them, but more especially modified meta titanic acid freed from such impurities as sulphuric anhydrides and chlorine, have, when manufactured into paints, greater hiding and covering power than has the titanic oxide heretofore commercially producible. The use of titanic oxide as a pigment has been long known both in chemical and mechanical combinations with other substances, such as roasted ilmenite, red mud and sludge from bauxite ores, titanium carbide, and as pure titanic oxide uncombined with other substances.

The manufacture of titanic oxide for pigment is always carried out by bringing it into acid solution with hydrochloric or sulphuric acid, together with such soluble impurities as iron, which the raw material may contain, and separating the titanium from the solution as an amorphous hydrated titanic oxide. When this oxide is separated from hydrochloric acid solution, it always carries with it chlorine, which is supposed to be present as a titanium hydrochloride. When separated from sulphuric acid solutions, it contains sulphuric acid, supposed to be combined to form basic titanic sulphate. The basic titanic sulphate present varies in quantity from 9% to 31%. The precipitates also contain iron, varying with the amount of iron present in the solution, and dependent upon the method used for precipitation.

The effect of the iron is to produce a yellowish color of the titanic oxide, rendering it unsuited for the manufacture of white paints. This is particularly true when the iron is present in quantities, such as is often the case. The sulphuric acid and chlorine are removed from the hydrated oxide together with the combined water by heating to temperatures sufficiently high to decompose the sulphates or chlorides present. When the hydrates are heated, they give off their combined water at temperatures under 900° F., but are not entirely freed from $SO_3$ and chlorine, even after heating to 1500° F. At 1100° F., basic titanic sulphate begins to give off $SO_3$, and at the same temperature, titanic oxide begins to change from a soft amorphous powder to one containing hard gritty particles which greatly reduce its value as a pigment. If the heating is carried to the temperature necessary to render it relatively free from $SO_3$, it becomes so hard and gritty as to be of little value as a pigment. Owing to the greater cost and difficulties in manufacture, hydrochloric acid solutions are not available for commercial manufacture of titanic oxide or modified metatitanic acid pigments. If titanic oxide or modified metatitanic acid which contains appreciable amounts of $SO_3$, that is, amounts in excess of .35% are manufactured into paints, the acid reacts to cause the paint produced to rapidly deteriorate by changing to a yellowish color and to chalk.

In my aforementioned applications, I have disclosed processes whereby both iron and sulphuric acid may be so completely eliminated from modified metatitanic acid that I obtain it of a uniform white color free from any gritty particles. The modified metatitanic acid so produced is superior to titanic oxide heretofore produced in both hiding and covering power. In its purest state, it contains 96.69% $TiO_2$ and 4.31% $H_2O$, when dried at 100° C., corresponding to the formula $H_2Ti_5O_{11}$. It has a specific gravity of 3.20 to 3.30. It may contain more combined water owing to the presence of more highly hydrated oxides of titanium up to 10%. It is a fixed compound which does not materially absorb water when exposed to damp atmosphere.

Calcined $TiO_2$ obtained by heating purified modified metatitanic acid as disclosed in my above mentioned applications ranges in specific gravity from 3.30 to 3.45, and purified modified metatitanic acid as disclosed in said applications ranges in specific gravity from 3.20 to 3.30.

Authorities differ as to the composition or normal metatitanic acid. Armstrong, Meldola and Butler give it $5TiO_2 10H_2O$ air dried; $H_{10}Ti_5O_{15}$ dried at 100° C. Rosco $TiO(OH)_2$ drying temperature not stated; Merz $H_2TiO_3$ air dried; $H_2TiO_3 2TiO_2$ at 100° C.; $H_2TiO_3 3TiO_2$ at 120° C.; $H_2TiO_3 4TiO_2$ at 160° C.

My observation has been that metatitanic acid precipitated from hydrochloric acid solution and containing a relatively small quantity of chlorine contained, air dried at 25° C., 73.78% $TiO_2$ and 26.13% $H_2O$; dried at 100° C., 84.92 $TiO_2$ and 15.08 $H_2O$; at 200° C., 92.55 $TiO_2$ and 7.45 $H_2O$. The product dried at 200° C., was not a fixed compound, in that it rapidly absorbed water from the air till it contained in excess of its contents dried at 100° C. The product dried at 100° C. was more nearly a fixed compound, but absorbed water till it contained 17.90% $H_2O$ and 82.10 $TiO_2$ corresponding closely to the formula $H_{10}Ti_5O_{15}$ or $TiO(OH)_2$.

I have found that when modified metatitanic acid is manufactured into paints without admixture with other pigments, it produces a paint which has greater hiding power than have paints manufactured from any known pigments heretofore produced on a commercial scale. Also that the dried paint film is softer and more elastic than are paint films from paints composed of white lead or zinc oxide. Also that it dries slower than white lead or zinc oxide paints. In the manufacture of my novel paint, I mix with my modified metatitanic acid such an amount of a pigment which dries to a hard surface as may be necessary to give my paint the characteristics required for the special use for which it is intended. I have found that there are many substances which will give the desired result. On account of their wide distribution and comparative cheapness, I prefer to use white lead or zinc oxide or a mixture of the two. I have used many proportions of these in paints ranging from one part zinc oxide to five parts modified metatitanic acid, to equal parts zinc oxide and modified metatitanic acid and one part white lead to three parts modified metatitanic acid to three parts white lead to two parts modified metatitanic acid, and have obtained from them satisfactory results. I have found that the larger the proportion of zinc or lead pigment used, the less covering and hiding power my paint will have. I have also found that, owing to the greater hiding power of my pigment, I may mix with my paint a greater proportion of those substances which are generally known as mineral extenders, which are less costly than even my modified metatitanic acid pigment and much less so than white lead or zinc oxide pigments. I have found either one or more of such extenders suitable for the purpose specified, viz, barytes, silica, asbestine, whiting, gypsum and china clay.

Further description, I believe, is unnecessary to enable those skilled in the art to produce my said paints, since it follows that my modified metatitanic acid is mixed with the other constituents of the paint and mixed or ground with drying oil, such as linseed oil or other suitable vehicle, such as dissolved gum or other varnish, in substantially the same manner as are white lead, zinc oxide or mixed paints, and is then ready for application in any suitable manner, to the surfaces to be covered, as by brushing on or otherwise, or the various ingredients of the paints may be ground separately with the vehicle and then brought together and mixed.

I have referred more especially to the use of my new pigment for the manufacture of white paint, but do not confine myself to such, for by substituting coloring matter for one or more of the white constituents, many tinted and colored paints may be produced, without departing from the spirit of my invention.

I claim:

1. A paint having as a pigment a white amorphous powder, consisting of a hydrated titanium oxide containing less than 10% of combined water, substantially as described.

2. A paint having as a pigment a hydrated titanium oxide containing less than 10% of combined water and substantially free from combined sulphuric acid, substantially as described.

3. A paint having as a pigment a hydrated titanium oxide containing less than 10% of combined water and substantially free from iron and combined sulphuric acid, substantially as described.

4. A paint having as a pigment a titanium compound consisting essentially of five molecules of $TiO_2$ combined with not more than three molecules of $H_2O$, substantially as described.

5. A paint having as a pigment an amorphous powder consisting essentially of five molecules of $TiO_2$ combined with not more than two molecules of $H_2O$, substantially as described.

6. A paint having as a pigment a substance consisting essentially of a hydrated titanium oxide containing not more than 10% of water in combination, substantially as described.

7. A paint having as a pigment a calcined titanium oxide in the form of a fine amorphous non-granular powder having a specific gravity of 3.30 to 3.45, substantially as described.

8. A paint having as a pigment a stable calcined titanium oxide in the form of a fine smooth non-granular powder having a specific gravity not exceeding 3.45, substantially as described.

In testimony whereof I have hereunto set my hand.

FRANK E. BACHMAN.